July 10, 1962 K. BIEDENDIECK ET AL 3,043,637
THRUST BEARING FOR DRILLING TURBINES Filed March 14, 1960 2 Sheets-Sheet 1

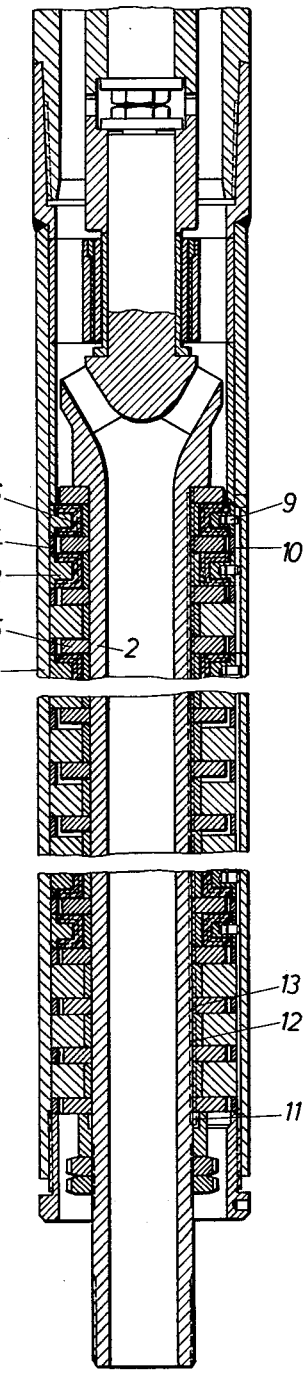

3,043,637
THRUST BEARING FOR DRILLING TURBINES
Karl Biedendieck, Bentheim, Reg. Bezirk, Osnabruck, and Karl Kaufmann, Heidenheim (Brenz), Germany, assignors to J. M. Voith G.m.b.H., Heidenheim (Brenz), Germany
Filed Mar. 14, 1960, Ser. No. 14,582
Claims priority, application Germany Mar. 14, 1959
2 Claims. (Cl. 308—162)

The present invention relates to thrust bearings for drilling turbines. In order to be able to adapt the output of drilling turbines to the geological conditions at the drilling station, which geological conditions frequently vary within wide limits, it has been suggested to compose the drilling turbines of a plurality of sections thereby making it possible to build up the drilling turbines of more or less sections and thereby to carry out the drilling operation with more or less turbine stages depending on the hardness of the rock to be drilled.

According to a further new suggestion, the entire thrust bearing for such drilling turbines is combined in a separate section. Such an arrangement brings about the advantage that the thrust bearing, which is subjected to a particularly high wear, can be removed and replaced as an entirety without disturbing the remaining portion of the drilling turbine.

The above mentioned suggestion to operate a drilling turbine with a plurality of sections and thus with different numbers of stages, brings about that also the load on the thrust bearing will vary within wide limits. Therefore, the thrust bearing must be so designed that it will be sufficiently dimensioned in order to withstand the load at a maximum number of turbine stages. This in turn has the drawback that the thrust bearing will be relatively overdimensioned when operating with few turbine stages and will in such an instance be subjected to too high friction losses.

With drilling turbines having a constant number of stages, it is further necessary so to design the thrust bearing that it will be able to withstand maximum stresses when drilling hard rocks. However, in such an instance, when drilling soft rocks at a corresponding low drilling pressure, the bearing surfaces are too large.

For the sake of completeness it may be added that it is known to vary the specific bearing load by controllable hydraulic compensating means.

It is, therefore, an object of the present invention to provide a thrust bearing for drilling turbines which will overcome the above mentioned drawbacks.

It is also an object of this invention to provide a method of adapting a thrust bearing comprising thrust discs and supporting rings to different pressure loads on a drilling turbine in such a way that it can easily be varied in conformity with the respective load on the drilling turbine.

It is still another object of this invention to provide a thrust bearing for drilling turbines comprising a plurality of thrust discs and supporting rings, in which individual elements of the bearing can easily be exchanged so that the thrust bearing can easily be adapted to various load conditions.

These and other objects and advantages of the invention will appear more clearly from the following specification in connection with the accompanying drawing, in which FIG. 1 illustrates a section through a bearing according to the invention for maximum load in both directions.

FIG. 4 is a longitudinal section taken along the shaft of a drilling turbine with a bearing designed in conformity with the present invention for maximum load in one direction and for partial load in the opposite direction.

Figure 1:
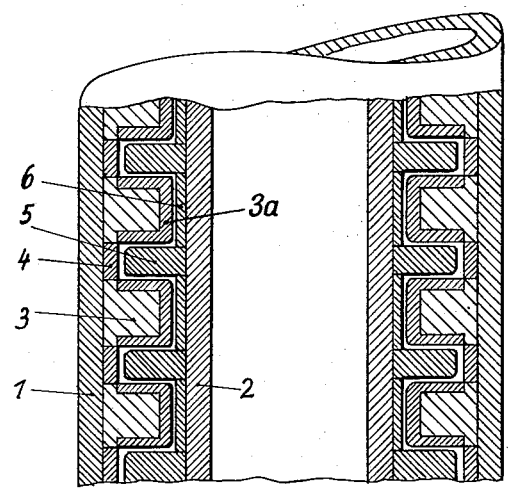

According to the method of the present invention, a thrust bearing comprising a plurality of thrust discs of steel connected to the turbine wheel and comprising a plurality of supporting rings arranged on both sides of the thrust discs and connected to the housing and preferably provided with running surfaces of rubber, may be adapted to various loads by removing or exchanging individual elements such as supporting rings, thrust discs and spacers.

For instance, for uniformly reducing the effective bearing surfaces in both directions, a number of the supporting rings may be removed or may together with spacer members be replaced by corresponding longer spacer elements. The interposed thrust discs may likewise be removed and replaced by corresponding spacer members, or the spacer members may be retained.

In order to allow a unilateral change in the supporting surfaces, for instance in such a way that only that supporting surface will be varied which acts in a certain direction, according to a further embodiment of the invention, individual thrust discs or individual supporting rings may be exchanged and replaced by differently shaped discs or rings in such a way that the individual thrust discs will rest only on one or the other side of said supporting rings.

For purposes of practicing the method according to the present invention, the thrust bearing is built up in a manner known per se from individual supporting rings alternating with thrust discs connected to the turbine shaft, said thrust discs being individually exchangeable. Furthermore, spacer members of corresponding length are designed as replacements for the supporting rings or thrust discs to be removed and are held in stock. Depending on the local conditions, such spacer members or rings may be designed as replacement for one or more supporting rings and/or thrust discs. If required, a plurality of such spacer rings may be held in stock which may also vary as to length.

For purposes of effecting such unilateral change in the supporting surfaces, the thrust discs and supporting rings are likewise designed exchangeably. Furthermore, thrust discs and/or supporting rings of different shape may be produced and so designed that when installing these elements, individual supporting rings will only on one side thereof engage said thrust discs.

If the thrust bearing is so designed that between the successive thrust discs there is arranged a spacer member corresponding in its axial length to a supporting ring, and if between successive supporting rings there is provided a spacer member corresponding in its axial length to a thrust disc, it will be sufficient for the unilateral change in the bearing surface, to design the spacer members in such a way that they can likewise be exchanged. Furthermore, pairs of spacer members may be held available which are somewhat longer and, depending on the respective requirements, a plurality of pairs of spacer members may be exchanged for such having a greater length.

Referring now to the drawing in detail illustrating in partial section the thrust bearing section of a drilling turbine, the outer pipe of such section is designated with the reference numeral 1 whereas the hollow shaft portion of the turbine has been designated with the reference numeral 2. According to FIG. 1, the outer pipe 1 has mounted thereon in alternating arrangement thrust discs 3 and spacer members or spacer rings 4. Supporting rings 5 which together with the spacer members 6 are mounted on the hollow shaft portion 2 are rotatable between the thrust discs 3. The spacer rings 4 correspond to the supporting rings 5 as to their axial length, whereas the spacer members 6 correspond to the thrust discs 3 including the rubber cover 3a thereon. With such an arrangement, all thrust discs are bearing in one as well as in the opposite direction.

Figure 2:
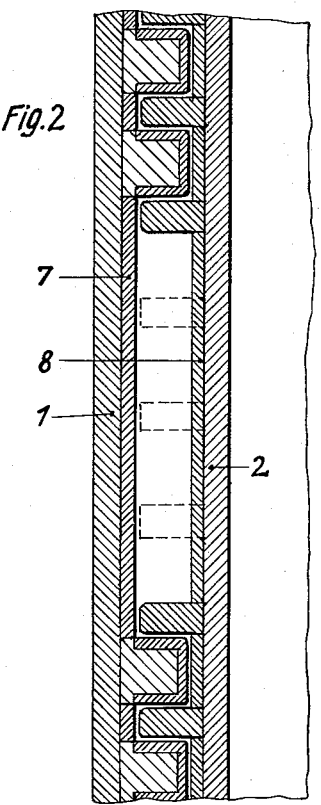
FIG. 2 represents a section through a bearing according to the invention as it may be built up for partial load in both directions.

With the arrangement according to FIG. 2, this arrangement differs from that of FIG. 1 inasmuch as some thrust discs and spacer members have been removed and have been replaced by longer spacer members 7. Similarly, also some supporting rings 5 and spacer members 6 have been removed and have been replaced by a spacer bushing or sleeve 8.

As indicated by dash lines, the bearing rings may be retained for this purpose. In this arrangement, the thrust bearing is suitable for a lower load and, more specifically, in the same manner for both directions as it might be required if the drilling operation is not carried out with all turbine sections.

Figure 3:
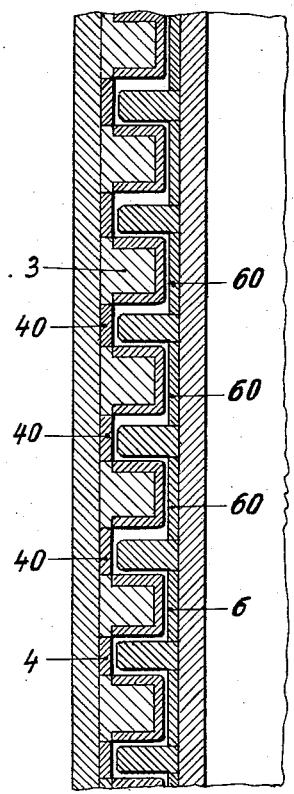
FIG. 3 is a section through a thrust bearing according to the invention built up for maximum load in one direction and for partial load in the opposite direction.

With regard to the arrangement according to FIG. 3, this arrangement differs from that of FIG. 1 inasmuch as some spacer rings 4 and 6 have been removed and have been replaced by longer spacer rings 40 and 60 so that some supporting rings are unilaterally lifted off from the thrust disc. In such an arrangement, the thrust bearing is suitable for full load in one direction and for a partial load in the opposite direction.

The thrust discs and/or thrust rings may also be so designed that they together with a spacer member form a single piece.

It is, of course, to be understood that the present invention is, by no means, limited to the particular constructions shown in the drawings but also comprises any modifications within the scope of the appended claims.

Thus, while the thrust discs 3 may be connected to the housing 1 and the supporting rings 5 may be connected to the turbine shaft in any desired manner, it has proved highly advantageous to effect this connection by pinions 9 provided in the thrust discs 3 to engage in a groove 10 in the housing 1 on the one hand and by a full-length key 11 on the other hand inserted in a groove 12 in the shaft 2 to engage in grooves 13 in the supporting rings 5 and the spacer members 6, which by way of example may be designed as radial bearing sleeves, thus interconnecting the parts 3 and 1 on the one hand and the parts 5, 6 and 2 on the other, providing torsional rigidity of the assemblies without detracting from the easy installation and removal of the thrust discs 3 and of the supporting rings 5 and spacer members 6.

This arrangement is illustrated in detail in FIG. 4 in which those parts corresponding to similar parts of FIGS. 1 to 3 have been designated with the same reference numerals.

It will be understood that this invention is susceptible to modification in order to adapt it to different usages and conditions and accordingly, it is desired to comprehend such modifications within this invention as may fall within the scope of the appended claims.

What we claim is:

1. In a method of varying, in conformity with drilling pressure, a thrust bearing for the shaft of a drilling turbine, said thrust bearing comprising a plurality of supporting ring means surrounding said shaft and axially spaced from each other by spacer members, and a plurality of thrust disc means in bearing engagement with said supporting ring means and axially spaced from each other by spacer members, said means and members being individually replaceable, the step of replacing at least one of said spacer members by other spacer members of varying length for varying the total engaging surface of said supporting ring means and for varying said thrust disc means in at least one of two axial directions, whereby the effective supporting surface of said thrust bearing is varied in at least one of said two axial directions.

2. A drilling turbine having a turbine shaft and also having a variable load thrust bearing for said turbine shaft, said thrust bearing comprising a plurality of adjacent supporting ring means surrounding said shaft, and a plurality of thrust disc means in bearing engagement with said supporting ring means, first spacer members separating said adjacent supporting ring means, second spacer members separating said adjacent thrust disc means, and additional first and second spacer members, the length of said additional spacer members being different from the length of said first and second spacer members, said first spacer members being interchangeable with said additional first spacer members, and said second spacer members being interchangeable with said additional second spacer members, whereby the spacing between and the effective bearing engagement of said supporting ring means and said thrust disc means may be selectively varied to meet the requirements of various imposed loads.

References Cited in the file of this patent

UNITED STATES PATENTS 2,708,610   Donaldson et al. _____ May 17, 1955

FOREIGN PATENTS 204,508   Austria _____ July 25, 1959